United States Patent [19]
Schweiger

[11] 3,716,526
[45] Feb. 13, 1973

[54] REFINING OF HEMICELLULOSES

[75] Inventor: Richard G. Schweiger, Muscatine, Iowa

[73] Assignee: Grain Processing Corporation, Muscatine, Iowa

[22] Filed: Oct. 19, 1971

[21] Appl. No.: 190,656

[52] U.S. Cl. .............................260/212, 260/209 R
[51] Int. Cl. .......................C08b 19/00, C08b 29/08
[58] Field of Search.................260/209 R, 212; 195/9

[56] References Cited

UNITED STATES PATENTS

| | | | |
|---|---|---|---|
| 2,073,616 | 3/1937 | Acree | 260/209 R |
| 121,130 | 11/1871 | Rothe | 195/9 |
| 579,572 | 3/1897 | Geige | 195/9 |
| 967,001 | 8/1910 | Deiss | 195/9 |
| 3,507,852 | 4/1970 | Kuchmy | 260/209 R |

*Primary Examiner*—Donald E. Czaja
*Assistant Examiner*—Ronald W. Griffin
*Attorney*—Fred T. Williams et al.

[57] ABSTRACT

Purification of crude hemicellulose by extracting with an aqueous organic acid.

3 Claims, No Drawings

REFINING OF HEMICELLULOSES

This invention relates to a novel method of obtaining refined hemicelluloses.

Hemicelluloses belong to the class of polysaccharide gums and, as such, have a great commercial potential, particularly the refined grades of this product. Hemicelluloses or pentosans usually are obtained from vegetable fiber substances, such as corn hulls, oat hulls, wheat bran, and the like by an alkaline extraction with alkali or alkali earth hydroxides. Alkaline extraction of hemicellulose from such substances is dealt with, for example, in U.S. Pat. No. 2,709,699 issued May 31, 1955; U.S. Pat. No. 2,801,955 issued Aug. 6, 1957; and U.S. Pat. No. 2,868,778 issued Jan. 13, 1959. If a crude material is satisfactory, the whole extract may be dried in any conventional fashion to produce a crude hemicellulose. If a more refined product is desired, the extract can be mixed with a water-miscible solvent, such as methanol, ethanol, isopropanol or acetone, whereupon the hemicellulose product precipitates and may be removed and dried. However, the refined product as obtainable by such conventional methods has shortcomings, among which the presence of certain impurities, particularly pigments, is the most obvious. Also, the conventional solvent precipitation from an aqueous solution which requires large amounts of alcohols or acetone is expensive and necessitates a high selling price which is economically prohibitive for a number of important applications.

One object of the present invention is to provide a low cost method for production of highly refined hemicellulose gums.

Another object of the present invention is the production of refined hemicellulose gums which are relatively colorless and the nitrogen content of which is greatly reduced. Other objects of the invention will become apparent from the following description.

In essence, the present invention involves extraction of a crude hemicellulose under controlled acidic conditions to remove a substantial majority of the undesirable impurities. The crude hemicellulose may be obtained by any conventional method from vegetable fiber substances, such as corn hulls, oat hulls, wheat bran, etcetera. Thus, for example, corn hulls or oat hulls are washed thoroughly with water, preferably hot water, at a pH of 7-9 to remove most of the residual starch and protein. Then, they are suspended in water and a base, such as calcium, sodium, potassium hydroxides and the like, is added, and the mixture heated with agitation. Subsequently, the viscous mixture is centrifuged, the solids discarded, and the extract neutralized, filtered, if necessary, and dried by various means to produce the crude starting material for the process of this invention. Procedures up to this step are well known in the art and any of them is suitable.

In accordance with this invention, a dried, crude hemicellulose extract is purified to a high degree by suspending the dried, powdered extract in an aqueous organic acid. A variety of liquid water-miscible organic acids can be employed, representative acids being formic, acetic, propionic, butyric, pentanoic and the like. The concentration of the water in the aqueous organic acid is sufficiently high to permit the hemicellulose to swell to some extent but not excessively. The water concentration should be limited such that impurities become soluble while avoiding appreciable solubilization of the hemicellulose in the extractant. The amount of water present in the organic acid depends on the particular acid used and as a rule the higher the molecular weight of the acid the more water can be employed. For example, in the case of acetic acid the preferred amount of water is about 5 to 15 percent by weight, while with propionic acid the water may be present in an amount as high as 20 percent by weight. In contrast, with formic acid very little water, say not more than 1-2 percent by weight, should be employed so as to avoid excess swelling and/or partial solubilization of the hemicellulose.

The amount of the aqueous organic acid extractant which is employed is not particularly critical, but an amount sufficient to form a workable suspension should be employed. For example, from about 60 to 250 milliliters of the extractant is employed for treating 30 grams of dry, crude hemicellulose. The dried hemicellulose suspended in the aqueous organic extractant is agitated for about 15 minutes to several hours. Generally a period of about 15 to 45 minutes is sufficient. The extraction can be effected at ambient temperature but elevated temperatures not exceeding about 60° C. can be employed with advantage to accelerate swelling of the hemicellulose and solubilization of impurities in the extractant. The extraction can be carried out one or more times to improve efficiency of impurity removal.

Thereafter, the suspension is filtered or centrifuged with the impurities being removed with the liquid extractant. The solid residue of hemicellulose can then be washed once or several times with the extractant composition or one of higher acid concentration to insure complete removal of impurities; the extent of washing depending upon the desired purity of the product. It is also preferred, but optional, in the washing of the hemicellulose residue to employ as one or more wash liquids a neutral water-miscible solvent capable of absorbing water, such as an alcohol. The washing operation or operations can be carried out batchwise or continuously such as, for example, using a basket centrifuge which readily permits the water content of the washing liquids to be reduced gradually. In any event, after the removal of the aqueous solvent extract from the hemicellulose residue and washing thereof the hemicellulose is dried by any suitable means.

It is also within the scope of the present invention to employ as a purifying extractant an aqueous organic acid composition in which there is included a neutral water-miscible organic solvent as partial replacement of the organic acid. Representative of such neutral water-miscible organic solvents are methanol, ethanol, isopropanol, tertiary butyl alcohol, acetone and the like. This embodiment of the invention affords economic advantages by reducing the amount of organic acid required; the cost of organic acids usually being greater than that of say ethanol. In this case the amount of water employed in the extractant composition can be increased somewhat, particularly when a higher molecular weight alcohol or ketone is used. Again, however, the solvent mixture must not be such as to cause solubilization of the hemicellulose or excessive swelling such that separation of the extractant by filtration or centrifugation thereof would become difficult or even impossible. It is a routine and simple matter to determine empirically the optimum solvent extractant composition in each case. If the amount of neutral solvent, particularly higher molecular weight alcohols or ketones employed in the extractant composition, is excessively high, such as 40 to 50 percent or more by weight, the extraction of the impurities such as pigments, proteins, salts and so forth present with the hemicellulose is significantly reduced resulting in a less refined hemicellulose product of inferior quality.

Hemicellulose products which have been extracted as described when dissolved in water generally produce solutions having a relatively low pH, such as a pH of 3.5 to 4.5. Although this is not objectionable in many applications, it may be desirable occasionally to produce refined hemicelluloses which in water afford solutions of higher pH values. This can be accomplished either by exposing the dry refined hemicellulose solids to the vapor of a volatile base such as ammonium hydroxide or by adding a sufficient amount of a base to the wash liquids. While any base such as sodium or potassium hydroxide can be used in the washing operation, it is preferred to use a volatile base such as ammonium hydroxide so that any excess thereof is readily removed from the hemicellulose product during drying thereof.

The following specific examples further illustrate the invention.

EXAMPLE 1

Corn hulls were suspended in water, the pH adjusted to and maintained at 8.5 to 9.0, and the mixture heated at 95° C. for 20 minutes with agitation. The hulls then were removed and washed thoroughly until the wash water was clear. The cleaned corn hulls (100 pounds dry basis) were suspended in about 1,000 pounds of water, 15 pounds of calcium hydroxide was added, and the mixture heated at 100° C. for 1 hour with strong agitation. Carbon dioxide was introduced into the viscous mixture until a pH of 7–7.5 was reached to precipitate calcium. The mixture was then centrifuged, the cake washed and recentrifuged, and the supernatant liquids combined. The extract was adjusted to pH 5–5.5, filtered, and spray-dried to produce 45–50 pounds of crude hemicellulose gum.

The crude hemicellulose (30 grams) was suspended in about 100 milliliters of 90 percent aqueous acetic acid, stirred for 1 hour, and the residue filtered off, washed on the funnel with 95 percent aqueous acetic acid, and resuspended in 100 milliliters of 95 percent aqueous acetic acid and stirred for an additional 30 minutes. The product was then washed with glacial acetic acid and dried in vacuo at about 60° C.

The hemicellulose product obtained was practically colorless and when dissolved in water provided a solution having a pH of approximately 3.5 to 4. The yield of product was about 50 percent by weight and the protein content was about one-third of that of the starting crude material. When the product was exposed to vapor from concentrated ammonium hydroxide solution in a desiccator the pH of its aqueous solution was about 6.7.

EXAMPLE 2

The procedure of Example 1 was repeated except that in the final wash methanol was used instead of glacial acetic acid; the washing with methanol being carried out until the glacial acetic acid was essentially removed. The product obtained was substantially identical to the product obtained in Example 1.

EXAMPLE 3

The procedure of Example 1 was essentially repeated except that both extractions were carried out using 95 percent aqueous acetic acid. The results of this extraction were similar to the results achieved by the procedure of Example 1.

EXAMPLE 4

Crude hemicellulose obtained from oat hulls was subjected to a refining extraction with 90 percent acetic acid as described in Example 1. The results were not substantially different from those obtained by the procedure of Example 1.

EXAMPLE 5

Crude corn hull gum (30 grams) was suspended in 100 milliliters of 90 percent aqueous acetic acid, the mixture stirred for 1.5 hours, 50 milliliters of methanol added, and the solids filtered off on a fritted glass funnel and washed with a solvent mixture composed of methanol-acetic acid-water in a ratio of 7:2.5:0.5 (v/v). The addition of the 50 milliliters of methanol facilitated the subsequent filtration step without adversely affecting the product quality. The solids were resuspended in 100 milliliters of the solvent mixture with the 7:2.5:0.5 ratio, stirred for 30 minutes, filtered off again, washed with the same solvent, and finally dehydrated and washed with methanol until the acetic acid was essentially removed. The product was dried in vacuo at about 50° C. and the yield was about 50 percent.

EXAMPLE 6

Similar results were obtained when crude hemicellulose from oat hulls was treated in accordance with the procedure of Example 5.

EXAMPLE 7

Crude hemicellulose from corn hulls (30 grams) was suspended in a mixture of methanol-acetic acid-water in a ratio of 7:1:2 and stirred for 1–2 hours. The residue was removed, washed and resuspended in methanol-acetic acid-water with an 8:1:1 ratio, filtered off, and dehydrated by washing with anhydrous methanol. After drying in vacuo, a relatively colorless product was obtained in a 45–50 percent yield.

EXAMPLE 8

By repeating the procedure of Example 7 using ethanol in lieu of methanol, similar results were obtained.

EXAMPLE 9

Results similar to those of Example 7 were obtained when the ratio of methanol-acetic acid-water was 4:4:2 (v/v) or 1:8:1 (v/v) in the first extraction and 7:2:1 (v/v) in the second extraction.

EXAMPLE 10

Approximately 120 grams of crude corn hull hemicellulose gum (protein, dry basis — 4.8 percent viscosity of 5 percent solution — 12.8 centipoise) was suspended in 400 milliliters of a solvent mixture consisting of methanol-acetic acid-water in a ratio of 5:3:2, stirred 2 hours, the mixture filtered, and the solids washed and resuspended and stirred (30 minutes) with a solvent consisting of methanol-acetic acid-water with a 7:1.8:1.2 v/v ratio. The solids were filtered off again, washed with the same solvent combination, resuspended in methanol, filtered off again, washed on the funnel with methanol until all acid was removed, and dried in vacuo at 50° C. The product was obtained in a 47 percent yield, was almost colorless, and its 5 percent aqueous solution had a pH of 3.9 and a viscosity of 86 centipoise (Brookfield Viscometer, Model LVT, 60 rpm, 25° C.). The dry basis protein content of the product was slightly above 1 percent.

EXAMPLE 11

Crude corn hull hemicellulose (30 grams) was extracted once with 130 milliliters of a solvent mixture consisting of methanol-formic acid-water with a v/v ratio of 4:5.4:0.6 and once with the same solvent mixture having a ratio of 5:4.5:0.5. Dehydration and removal of excess acid was carried out with methanol. A relatively colorless product was obtained in a 45 percent yield with a protein content of 0.83 percent. The viscosity of a 5 percent aqueous solution was 90.7 centipoise and its pH 3.5.

EXAMPLE 12

Crude corn hull hemicellulose (30 grams) was extracted once with 130 milliliters of a solvent mixture consisting of isopropanol-formic acid-water at a ratio of 4.5:8.1:0.84 (v/v) and once with the same solvent mixture in a ratio of 3:5.4:0.6. Washing was carried out with isopropanol. The yield of the final product was 62 percent and the viscosity of a 5 percent aqueous solution thereof was 43.2 centipoise with the solution having a pH of about 2.5. The pH of the aqueous solution of the product was raised to about 6 by exposure of the dry product to ammonium hydroxide vapor and the viscosity of a 5 percent aqueous solution was then 38.5 centipoise.

EXAMPLE 13

One 30 gram sample (A) of crude corn hul hemicellulose gum was extracted with 90 percent and, subsequently, 95 percent aqueous acetic acid, as described in Example 1; another sample (B) with a methanol-acetic acid-water mixture, as described in Example 10. The samples were then washed and dehydrated with anhydrous methanol and dried in vacuo at 50° C.

Additionally, corn hulls were extracted under alkaline conditions as described in the first paragraph of Example 1. However, the fresh extract, instead of being spray dried, was poured slowly and with stirring into three volumes of methanol and the precipitate removed, washed with methanol, and dried. This is in accordance with the purification procedure as commonly practiced in the art. Products (A) and (B) obtained by extraction using an aqueous organic acid extractant, however, were considerably lighter than the product obtained by the prior art procedure. As determined by nitrogen analysis, the protein content of Product A was below 2 percent.

It has been observed that some purification of crude hemicelluloses can be achieved by extraction with an aqueous alcohol, but products obtained by such treatment are generally inferior to those obtained by the purification process of the present invention.

Those modifications and equivalents which fall within the spirit of the invention are to be considered a part thereof.

WHAT IS CLAIMED IS:

1. A process for removing impurities from crude hemicellulose gum which comprises suspending crude solid hemicellulose gum in an aqueous organic acid-containing liquid which solubilizes impurities associated with said gum but which does not substantially solubilize said gum, then separating said hemicellulose gum from said liquid and drying said separated hemicellulose gum.

2. A process in accordance with claim 1 wherein said aqueous organic acid-containing liquid also contains a water-miscible solvent selected from the group consisting of lower alkanols and ketones.

3. A process in accordance with claim 1 wherein after drying said separated hemicellulose gum the dried gum is exposed to vapors of ammonium hydroxide.

* * * * *